(12) United States Patent
Inoue et al.

(10) Patent No.: US 9,521,577 B2
(45) Date of Patent: Dec. 13, 2016

(54) GUIDANCE DEVICE, GUIDANCE SYSTEM, AND GUIDANCE METHOD

(71) Applicant: FUJITSU LIMITED, Kawasaki-shi, Kanagawa (JP)

(72) Inventors: Yoshinori Inoue, Yokohama (JP); Yoshiaki Ohnishi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 438 days.

(21) Appl. No.: 14/247,311

(22) Filed: Apr. 8, 2014

(65) Prior Publication Data
US 2014/0342742 A1 Nov. 20, 2014

(30) Foreign Application Priority Data
May 15, 2013 (JP) ................. 2013-103201

(51) Int. Cl.
H04W 40/00 (2009.01)
H04W 28/02 (2009.01)
H04W 76/02 (2009.01)

(52) U.S. Cl.
CPC ....... *H04W 28/0289* (2013.01); *H04W 76/022* (2013.01)

(58) Field of Classification Search
None
See application file for complete search history.

(56) References Cited

U.S. PATENT DOCUMENTS 5,661,721 A 8/1997 Hosoda et al.
2003/0220115 A1* 11/2003 Hitzeman ............. H04W 28/18
455/453

FOREIGN PATENT DOCUMENTS

JP 8-195748 7/1996
JP 2002-300272 10/2002

* cited by examiner

*Primary Examiner* — Suhail Khan
(74) *Attorney, Agent, or Firm* — Staas & Halsey LLP

(57) ABSTRACT

A guidance device includes an audio guidance transmission unit configured to transmit audio guidance to encourage refraining from a call reoriginating operation to a caller terminal when first identification information to identify a first exchange that is in a congestion state and second identification information to identify the caller terminal are received from the first exchange, and a connection control unit configured to cause the caller terminal and a callee terminal to be connected through a second exchange that is not in the congestion state based on the received first identification information, the received second identification information, and presence or absence of the congestion state of exchanges under management.

13 Claims, 17 Drawing Sheets

FIG. 4A

| RESERVATION ORDER | CALLER TERMINAL ID | CALLEE TERMINAL ID |
|---|---|---|
| 1 | 09011114444 | 09011115555 |
| 2 | 09011112222 | 09011113333 |
| ⋮ | ⋮ | ⋮ |

FIG. 4B

| EXCHANGE ID | CONGESTION STATE | OPERATIONAL STATUS |
|---|---|---|
| 001 | ABSENT | NORMAL |
| 002 | PRESENT | CONGESTION |
| 003 | ABSENT | NORMAL |
| 004 | ABSENT | NORMAL |
| 005 | ABSENT | NORMAL |
| 006 | ABSENT | NORMAL |

FIG. 4C

| GUIDANCE ID | AUDIO GUIDANCE |
|---|---|
| 1 | THIS IS THE VOICEMAIL CENTER. |
| 2 | YOUR CALL IS BEING CONNECTED. PLEASE REFRAIN FROM CALLING AGAIN AND HOLD ON FOR A WHILE LONGER. |
| 3 | YOUR CALL CANNOT BE COMPLETED BECAUSE THE TELEPHONE OF THE NUMBER YOU HAVE CALLED IS SWITCHED OFF. |
| ⋮ | ⋮ |

GUIDANCE DEVICE, GUIDANCE SYSTEM, AND GUIDANCE METHOD

CROSS-REFERENCE TO RELATED APPLICATION

This application is based upon and claims the benefit of priority of the prior Japanese Patent Application No. 2013-103201, filed on May 15, 2013, the entire contents of which are incorporated herein by reference.

FIELD

The embodiments discussed herein are related to a guidance device, a guidance system, and a guidance method.

BACKGROUND

Internet protocol multimedia subsystem (IMS) is a known architecture, which unites public communication networks including a fixed telephone network and a mobile communication network based on Session initiation protocol (SIP) and delivers multimedia services. The IMS architecture is standardized by 3rd Generation Partnership Project (3GPP), which is a standards organization for third-generation mobile phone standards. Part of the IMS architecture is already employed in a third-generation mobile communication system that is in conformity with the International mobile telecommunications (IMT)-2000 standard and in a 3.9-generation mobile communication system that follows the third-generation mobile communication system. The IMS architecture is already used to offer communication services including Code division multiple access (CDMA), which is compatible with the third-generation mobile communication system, and Long term evolution (LTE), which is compatible with the 3.9-generation mobile communication system.

In a mobile communication network, a plurality of exchanges that process a call control signal for controlling the communication between a caller terminal and a callee terminal are accommodated. When the plurality of exchanges sequentially process the call control signal, the communication connection between the caller terminal and the callee terminal is established. Examples of the caller terminal and the callee terminal include a mobile terminal, such as a mobile phone or a portable information terminal.

In case of a large-scale disaster, it may be difficult to establish the communication connection between the caller terminal and the callee terminal. One of possible causes is that so many calls are originated for safety confirmation and so many call control signals are generated that the exchange that has received the call control signals may lose its processing capability. In this case, a measure to restrict the process for the call control signal is taken in the exchange so as to avoid a system crash that may be caused by the congestion state continuing in the exchange. For example, audio guidance is provided to the caller terminal that has failed to establish communication connection based on the restriction measures taken when the exchange enters the congestion state so that the caller terminal is informed that the call originated by the caller terminal is unable to be connected because of the heavy communication. Typically, when no communication is established, a caller terminal operation causes the caller terminal to stop the call for a time and originate a call again after that to attempt to establish communication connection.

There is a known technique, which avoids such a call reoriginating operation of the caller terminal in the above-described case. According to the technique, the acceptance time at which a call is received and the like are registered in a registration list of an exchange on the callee side in response to a request from the callee terminal, a number and the like of the caller terminal that satisfies conditions are registered in an acceptance list, the communication with the caller terminal is caused to end, and the communication connection is performed in order of the registration in the acceptance list after the end of the acceptance (see, for example, Japanese Laid-open Patent Publication No. 8-195748). The technique allows communication connection to be established after the congestion state is released, and unless the congestion state is released, no communication connection between the caller terminal and the callee terminal may be established.

SUMMARY

According to an aspect of the invention, a guidance device includes: an audio guidance transmission unit configured to transmit audio guidance to encourage refraining from a call reoriginating operation to a caller terminal when first identification information to identify a first exchange that is in a congestion state and second identification information to identify the caller terminal are received from the first exchange; and a connection control unit configured to cause the caller terminal and a callee terminal to be connected through a second exchange that is not in the congestion state based on the received first identification information, the received second identification information, and presence or absence of the congestion state of exchanges under management.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A illustrates an example of an identification information table;

FIG. 4B illustrates an example of an operational status table;

FIG. 4C illustrates an example of an audio guidance table;

DESCRIPTION OF EMBODIMENTS

An exchange that receives a call control signal transmitted from a caller terminal is specified, and unless a congestion state of the exchange is released, the caller terminal may fail to be connected to a callee terminal.

Embodiments of a guidance device, a guidance system, and a guidance method, which establish communication connection by inhibiting a call reoriginating operation onto the exchange that is in the congestion state, are described with reference to the drawings.

First Embodiment

Figure 1:
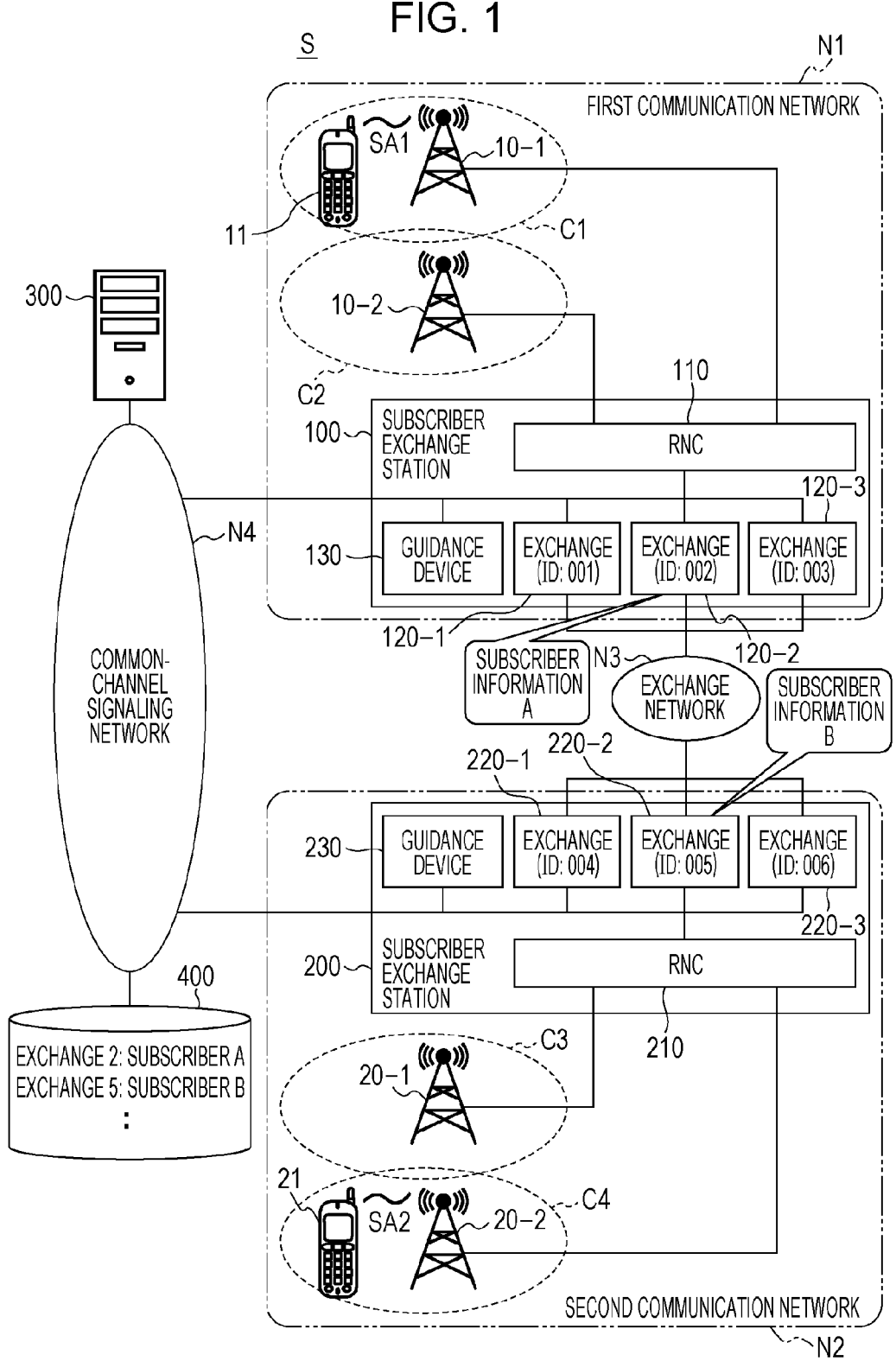
FIG. 1 illustrates a schematic structure of a communication system.

FIG. 1 illustrates a schematic structure of a communication system S. The communication system S includes base stations 10-1, 10-2, 20-1, and 20-2, subscriber exchange stations 100 and 200, a service controller 300, and a home location register (HLR) 400. The service controller 300 is also referred to as, for example, a communication service control station. The base stations 10-1 and 10-2, and the subscriber exchange station 100 are connected through, for example, an optical fiber cable or a metal cable. The similar may be applied to the base stations 20-1 and 20-2, and the subscriber exchange station 200. The base stations 10-1 and 10-2, and the subscriber exchange station 100 make up a first communication network N1. The base stations 20-1 and 20-2, and the subscriber exchange station 200 make up a second communication network N2.

The base stations 10-1 and 10-2 form cells C1 and C2, respectively, which are regions in which radio communication is possible. More specifically, the base station 10-1 may perform radio communication with a caller terminal 11 present in the cell C1. When the caller terminal 11 is present in the cell C2, the base station 10-2 may perform radio communication with the caller terminal 11. The similar may be applied to the base stations 20-1 and 20-2. For example, since the caller terminal 11 is present in the cell C1 in FIG. 1, the base station 10-1 receives visitor location information SA1 transmitted from the caller terminal 11 and a call control signal transmitted from the caller terminal 11. Since a callee terminal 21 is present in a cell C4, the base station 20-2 receives visitor location information SA2 transmitted from the callee terminal 21. The callee terminal 21 receives the call control signal transmitted from the base station 20-2. Examples of the caller terminal 11 and the callee terminal 21 include a mobile phone or a portable information terminal with a telephone function.

The visitor location information is information that indicates the cell in which the caller terminal or the callee terminal is present. The visitor location information includes subscriber identification information of a subscriber who has a contract to use a communication service, which is hereinafter referred to as a subscriber ID. The subscriber ID may be, for example, a 14-digit or 15-digit subscriber identification number, which is called International mobile subscriber identity (IMSI). The visitor location information is continuously or regularly transmitted to the base station as long as the caller terminal 11 of a subscriber A or a callee terminal 12 of a subscriber B is switched on. As described above, when the caller terminal 11 is present in the cell C1, the visitor location information SA1 is transmitted to the base station 10-1. When the caller terminal 11 moves from the cell C1 and is present in the cell C2, the visitor location information SA1 is transmitted to the base station 10-2. The similar may be applied to the callee terminal 21. The base stations 10-1 and 10-2 transmit the received visitor location information SA1 and the like to the subscriber exchange station 100. The base stations 20-1 and 20-2 transmit the received visitor location information SA2 to the subscriber exchange station 200.

The subscriber exchange station 100 includes a radio network controller (RNC) 110, a plurality of exchanges 120-1, 120-2, and 120-3, and a guidance device 130. The subscriber exchange station 200 includes an RNC 210, a plurality of exchanges 220-1, 220-2, and 220-3, and a guidance device 230. The RNC 110, the exchanges 120-1, 120-2, and 120-3, and the guidance device 130 are connected to one another. The connection is performed via an Internet protocol (IP) network, such as a local area network (LAN). The similar may be applied to the subscriber exchange station 200. The subscriber exchange stations 100 and 200 are connected to each other through an exchange network N3. The exchange network N3 is a communication network made up of a transit exchange, a gateway exchange, and the like. The exchange network N3 establishes the communication connection between the subscriber exchange stations 100 and 200. The subscriber exchange stations 100 and 200 may be directly connected to each other without passing through the exchange network N3.

The RNC 110 receives the visitor location information SA1 and a call control signal transmitted from the base station 10-1 or 10-2. The RNC 210 receives the visitor location information SA2 transmitted from the base station 20-1 or 20-2. The RNC 110 selects one of the exchanges 120-1, 120-2, and 120-3, and transmits the received visitor location information SA1 to the selected exchange. For example, the selection is performed in a round-robin manner. When the exchange 120-2 is selected, the RNC 110 transmits the visitor location information SA1 received from the base station 10-1 to the exchange 120-2. Similarly, when the exchange 220-2 is selected, the RNC 210 transmits the visitor location information SA2 received from the base station 20-2 to the selected exchange 220-2. The exchanges 120-2 and 220-2 transmit the received visitor location information SA1 and SA2 to the service controller 300, respectively.

The subscriber exchange stations 100 and 200, the service controller 300, and the HLR 400 are connected to one another through a common-channel signaling network N4. The common-channel signaling network N4 is a communication network formed from an exchange that is independent from a speech path and forwards information for controlling a call. Such an exchange is referred to as, for example, a common-channel signaling transit exchange. Common-channel signals including a call process signal and a network management signal are forwarded through the common-channel signaling transit exchange. For example, a signaling gateway (SGW) server is placed between the subscriber exchange stations 100 and 200, and the common-channel signaling network N4, and functions as an interface for the common-channel signaling network N4.

The service controller 300 controls a communication service performed in the communication system S. When the service controller 300 receives the visitor location information SA1 and SA2, the service controller 300 causes the HLR 400 to record the visitor location information SA1 and SA2. That is, the locations of the caller terminal 11 and the callee terminal 21 are registered. Thus, the service controller 300 may manage the cells in which the caller terminal 11 and the callee terminal 12 are currently present.

The HLR 400 further records a plurality of pieces of subscriber information in addition to the visitor location information SA1 and SA2. When the HLR 400 receives the visitor location information SA1 and SA2, the HLR 400 extracts corresponding subscriber information based on the subscriber IDs included in the visitor location information SA1 and SA2. The HLR 400 transmits the extracted subscriber information to the service controller 300. When the service controller 300 receives the subscriber information, the service controller 300 transmits the subscriber information to the exchanges that have transmitted the visitor location information SA1 and SA2. For example, the subscriber information of the subscriber A of the caller terminal 11, which is labeled "SUBSCRIBER INFORMATION A" in FIG. 1, is transmitted to the exchange 120-2. The subscriber information of the subscriber B of the callee terminal 12, which is labeled "SUBSCRIBER INFORMATION B" in FIG. 1, is transmitted to the exchange 220-2. In this manner, the subscriber information A and B are allocated to the exchanges 120-2 and 220-2, respectively. As illustrated in FIG. 1, the HLR 400 records the correspondence relation between the exchange and the subscriber information on the subscriber A or B after having transmitted the subscriber information.

As illustrated in FIG. 1, when a call control signal is transmitted from the caller terminal 11 to the callee terminal 12 while the subscriber information A is allocated to the exchange 120-2 and the subscriber information B is allocated to the exchange 220-2, the RNC 110 receives the call control signal through the base station 10-1. The call control signal includes a caller terminal ID, a callee terminal ID, and authentication information. The caller terminal ID and the callee terminal ID may be, for example, telephone numbers. The RNC 110 transmits the call control signal to the exchange 120-2 to which the subscriber information A is allocated.

The exchange 120-2 performs an authentication operation on the call control signal using the subscriber information A as described in detail below. When the exchange 120-2 completes the authentication operation, the exchange 120-2 makes an inquiry for the service controller 300 about the exchange to be connected to the callee terminal 12. In making the inquiry, the callee terminal ID is transmitted to the service controller 300. The service controller 300 checks the HLR 400 based on the callee terminal ID, and transmits the exchange ID of the subscriber information B, which is for example, an exchange number "005", to the exchange 120-2. When the exchange 120-2 receives the exchange ID, the exchange 120-2 is connected to the exchange 220-2 and transmits the call control signal to the exchange 220-2 through the exchange network N3. The exchange 220-2 transmits the received call control signal to the RNC 210. The RNC 210 performs a general call through the base stations 20-1 and 20-2. The callee terminal 21 that has received the call outputs a ringback tone. When the call receiving operation is performed on the callee terminal 21, the communication connection between the caller terminal 11 and the callee terminal 12 is established.

For example, when the exchange 120-2 or 220-2 that processes the call control signal is in the congestion state, the guidance device 130 or 230 transmits certain audio guidance to the caller terminal 11 based on a guidance request transmitted from the exchange 120-2 or 220-2 that is in the congestion state. In addition, when the callee terminal 21 is switched off, the guidance device 130 or 230 transmits a voice to the caller terminal 11 for informing the caller terminal 11 of the impossibility of starting the call or for leading to a voicemail center based on a service contract. The guidance devices 130 and 230 are described in detail below.

Referring now to FIGS. 2A to 2E, the above-described exchanges 120-1, 120-2, 120-3, 220-1, 220-2, and 220-3 are described in detail below. Each of the exchanges 120-1, 120-2, 120-3, 220-1, 220-2, and 220-3 basically has a similar configuration. Thus, the exchange 120-1 is explained as an exchange 120 as an example.

Figure 2:
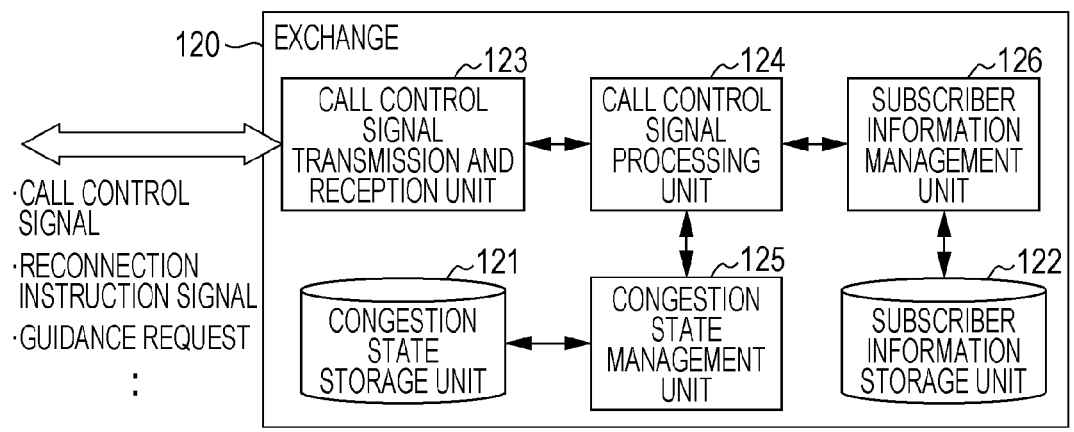
FIG. 2A is a block diagram illustrating an example of an exchange.
FIG. 2B illustrates an example of a congestion state table.
FIG. 2C illustrates another example of the congestion state table.
FIG. 2D illustrates an example of a subscriber information table of a subscriber A.
FIG. 2E illustrates an example of a subscriber information table of a subscriber B.

FIG. 2A is a block diagram illustrating an example of the exchange 120. FIG. 2B illustrates an example of a congestion state table. FIG. 2C illustrates another example of the congestion state table. FIG. 2D illustrates an example of a subscriber information table of the subscriber A. FIG. 2E illustrates an example of a subscriber information table of the subscriber B.

As illustrated in FIG. 2A, the exchange 120 includes a congestion state storage unit 121, a subscriber information storage unit 122, a call control signal transmission and reception unit 123, a call control signal processing unit 124, a congestion state management unit 125, and a subscriber information management unit 126. Examples of the exchange 120 include a line exchange, such as an SIP server or a call session control function (CSCF) server with an SIP server function.

The congestion state storage unit 121 stores the congestion state table. As illustrated in FIGS. 2B and 2C, the congestion state table includes items about a CPU usage rate and the congestion state. As illustrated in FIG. 2B, for example, when the CPU usage rate of the exchange 120 is "3%", "NORMAL" is registered as the congestion state, which indicates that power for processing the call control signal remains. As illustrated in FIG. 2C, when the CPU usage rate of the exchange 120 is "35%", "CONGESTION" is registered as the congestion state, which indicates that a smooth process for the call control signal may be hindered.

The switching of the congestion state dependent on the CPU usage rate may be set as appropriate based on a design for example.

The subscriber information storage unit 122 stores the subscriber information table. As illustrated in FIGS. 2D and 2E, the subscriber information table includes items about a terminal ID, a subscriber ID, authentication information, and contract information as the subscriber information. For example, the telephone number of the caller terminal 11 or the callee terminal 12 is registered as the terminal ID. A subscriber identification number referred to as the IMSI, which is described above, is registered as the subscriber ID. Information for comparison with the authentication information included in the call control signal is registered as the authentication information. Accordingly, even when the call control signal is transmitted to the exchange to which no subscriber information is allocated, the exchange 120 is unable to perform the authentication operation and thus unable to process the call control signal. That is, in order to process the call control signal, it is desired that the exchange 120 that performs the process hold the subscriber information. For example, a charging contract, such as a price plan, and a service contract, such as a voicemail service, are registered as the contract information. The subscriber information storage unit 122 is referred to as, for example, a visitor location register (VLR).

The call control signal transmission and reception unit 123 receives the call control signal transmitted from the RNC 110. The received call control signal is transmitted to the call control signal processing unit 124. The call control signal transmission and reception unit 123 transmits a guidance request to the guidance device 130 or 230. The call control signal transmission and reception unit 123 receives a reconnection instruction signal transmitted from the guidance device 130 or 230, which is described below. Furthermore, the call control signal transmission and reception unit 123 receives and transmits various kinds of signals and information.

The call control signal processing unit 124 receives the call control signal. When the call control signal processing unit 124 receives the call control signal, the call control signal processing unit 124 notifies the congestion state management unit 125 and the subscriber information management unit 126 of the call control signal. When the congestion state of which the call control signal processing unit 124 is notified from the congestion state management unit 125 indicates "NORMAL", the call control signal processing unit 124 performs various kinds of operations, such as the authentication operation, the call originating operation, the call receiving operation, a response operation, a disconnection operation, or a call origination supplementary service operation, based on the received call control signal. When the congestion state of which the call control signal processing unit 124 is notified indicates "CONGESTION", the call control signal processing unit 124 generates the guidance request including the exchange ID, the caller terminal ID, the callee terminal ID, and a logical guidance number (LGN), which identifies the audio guidance to be transmitted. The guidance request is referred to as, for example, an INVITE message. The guidance request is transmitted to the guidance device 130 or 230 through the call control signal transmission and reception unit 123. In addition, the call control signal processing unit 124 performs a reconnection operation based on the reconnection instruction signal transmitted from the guidance device 130 or 230.

The congestion state management unit 125 manages the congestion state of the exchange 120. More specifically, the congestion state management unit 125 accesses the congestion state storage unit 121 and checks whether or not the congestion state indicates "NORMAL". The congestion state management unit 125 notifies the call control signal processing unit 124 of the checked congestion state. As a result, when the call control signal processing unit 124 is notified of "NORMAL", the call control signal processing unit 124 performs the authentication operation on the call control signal.

The subscriber information management unit 126 manages the subscriber information. More specifically, the subscriber information management unit 126 accesses the subscriber information storage unit 122 and checks whether or not the subscriber information corresponding to the call control signal is stored. When the corresponding subscriber information is stored, the subscriber information management unit 126 acquires the subscriber information and transmits the acquired subscriber information to the call control signal processing unit 124. As a result, the call control signal processing unit 124 performs the authentication operation on the call control signal and the subscriber information. When the authentication operation is successful, the call control signal processing unit 124 performs the call originating operation and the like.

Referring now to FIGS. 3, 4A, 4B, and 4C, the above-described guidance devices 130 and 230 are described in detail below. Each of the guidance devices 130 and 230 basically has a similar configuration. Thus, the guidance device 130 is described as an example.

Figure 3:
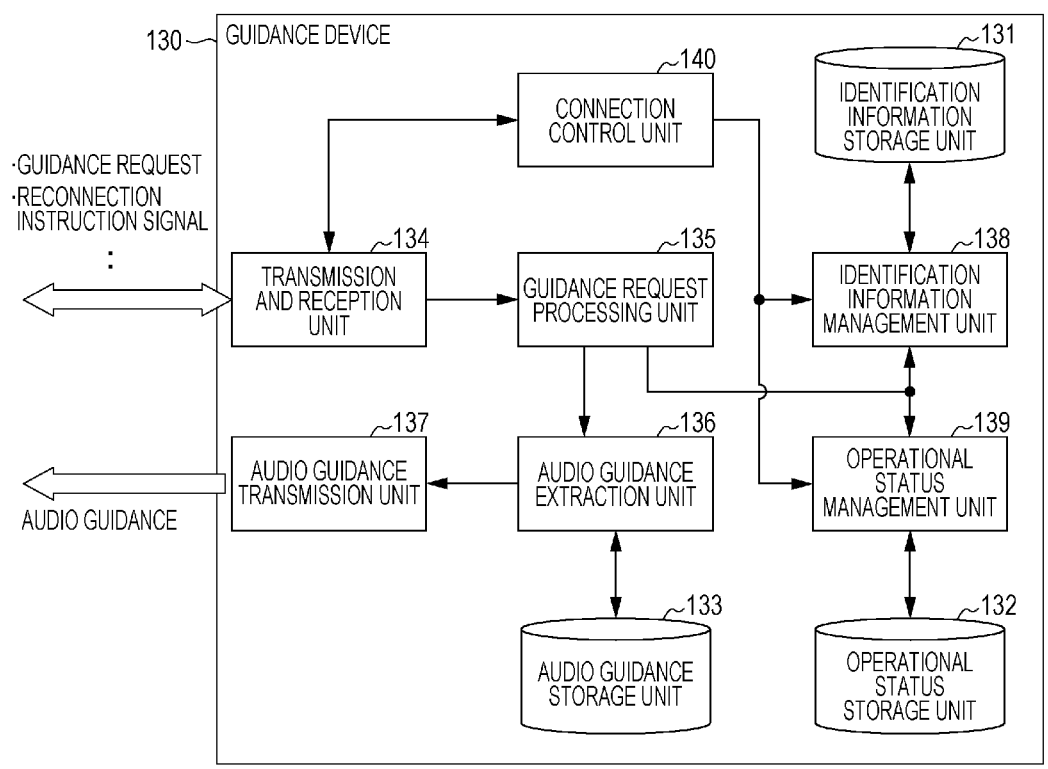
FIG. 3 is a block diagram illustrating an example of a guidance device.

FIG. 3 is a block diagram illustrating an example of the guidance device 130. FIG. 4A illustrates an example of an identification information table. FIG. 4B illustrates an example of an operational status table. FIG. 4C illustrates an example of an audio guidance table.

The guidance device 130 includes an identification information storage unit 131, an operational status storage unit 132, an audio guidance storage unit 133, a transmission and reception unit 134, a guidance request processing unit 135, an audio guidance extraction unit 136, an audio guidance transmission unit 137, an identification information management unit 138, an operational status management unit 139, and a connection control unit 140. The guidance device 130 may be, for example, a multimedia resource function (MRF) server.

The identification information storage unit 131 stores the identification information table. As illustrated in FIG. 4A, the identification information table includes items about a reservation order, the caller terminal ID, and the callee terminal ID. The telephone number allocated to the caller terminal 11 is registered as the caller terminal ID. The telephone number allocated to the callee terminal 21 is registered as the callee terminal ID. The order in which when the exchange 120 is in the congestion state, the reconnection is executed is registered as the reservation order. The reconnection operation is executed based on the reservation order. The reservation order, the caller terminal ID, and the callee terminal ID make up reservation information.

The operational status storage unit 132 stores the operational status table. The operational status table includes items about the exchange ID, the congestion state, and an operational status. The exchange ID indicates information for identifying each exchange, which is allocated to each of the exchanges 120-1, 120-2, 120-3, 220-1, 220-2, and 220-3. Although an exchange number is registered as the exchange ID in FIG. 4B, a character string or a combination of a character and a number may also be registered. The presence or absence of the congestion state regarding each of the exchanges 120-1, 120-2, 120-3, 220-1, 220-2, and 220-3 is registered as the congestion state. When the exchange ID is transmitted from each of the exchanges 120-1, 120-2, 120-3, 220-1, 220-2, and 220-3, the operational status management unit 139 switches the congestion state in the operational status table from "ABSENT" to "PRESENT" and switches the operational status from "NORMAL" to "CONGESTION". The exchange ID, the congestion state, and the operational status make up operational status information.

The audio guidance storage unit 133 stores the audio guidance table. The audio guidance includes a guidance ID and audio guidance as guidance information. The guidance ID indicates information for identifying the audio guidance. The audio guidance output from the caller terminal 11 is registered as the audio guidance.

The transmission and reception unit 134 receives the guidance request transmitted from one of the exchanges 120-1, 120-2, and 120-3 or one of the exchanges 220-1, 220-2, and 220-3. The received guidance request is transmitted to the guidance request processing unit 135. The transmission and reception unit 134 transmits the reconnection instruction signal transmitted from the connection control unit 140 to the exchange concerned. Furthermore, the transmission and reception unit 134 transmits and receives various kinds of information and signals.

The guidance request processing unit 135 acquires an LGN from the received guidance request. The guidance request processing unit 135 transmits the acquired LGN to the audio guidance extraction unit 136. Also, the guidance request processing unit 135 acquires the exchange ID from the received guidance request. The guidance request processing unit 135 transmits the acquired exchange ID to the operational status management unit 139. Furthermore, the guidance request processing unit 135 acquires the caller terminal ID and the callee terminal ID from the received guidance request. The guidance request processing unit 135 transmits the acquired caller terminal ID and the acquired callee terminal ID to the identification information management unit 138.

The audio guidance extraction unit 136 extracts the audio guidance based on the LGN transmitted from the guidance request processing unit 135. The audio guidance extraction unit 136 transmits the extracted audio guidance to the audio guidance transmission unit 137.

The audio guidance transmission unit 137 transmits the audio guidance transmitted from the audio guidance extraction unit 136 to the caller terminal 11. As a result, the audio guidance is provided to the caller terminal 11 through the RNC 110 and the base station 10-1. The audio guidance is played on the caller terminal 11 and the audio guidance reaches the caller. In this manner, when the exchange ID of the exchange that is in the congestion state and the caller terminal ID of the caller terminal 11 are received from the exchange that is in the congestion state, audio guidance that encourages refraining from the call reoriginating operation is transmitted to the caller terminal 11. The audio guidance is stopped when the user of the caller terminal 11 hangs up.

The identification information management unit 138 manages the received caller terminal ID and the callee terminal ID as a pair. The management is performed based on the registration into the identification information table. The identification information management unit 138 allocates the reservation order that indicates the order of the connection reservation to one of the pairs of the caller terminal ID and the callee terminal ID.

The operational status management unit 139 manages the operational status of each of the exchanges 120-1, 120-2, 120-3, 220-1, 220-2, and 220-3. More specifically, when the operational status management unit 139 receives an exchange ID, the operational status management unit 139 accesses the operational status storage unit 132 and switches the congestion state and the operational status. The operational status management unit 139 checks the operational status of each of the exchanges 120-1, 120-2, 120-3, 220-1, 220-2, and 220-3 continuously or regularly.

The connection control unit 140 causes the caller terminal 11 and the callee terminal 21 to be connected to each other through the exchange that is not in the congestion state based on the exchange ID, the callee terminal ID, and the presence or absence of the congestion state of each of the exchanges 120-1, 120-2, 120-3, 220-1, 220-2, and 220-3 under management. More specifically, the connection control unit 140 causes the caller terminal 11 and the callee terminal 21 to be connected to each other by transmitting an instruction to cause the exchange that is not in the congestion state to hold the subscriber information for processing the call control signal transmitted from the caller terminal 11. The connection is performed based on the reservation order registered in the identification information table.

Figure 5:
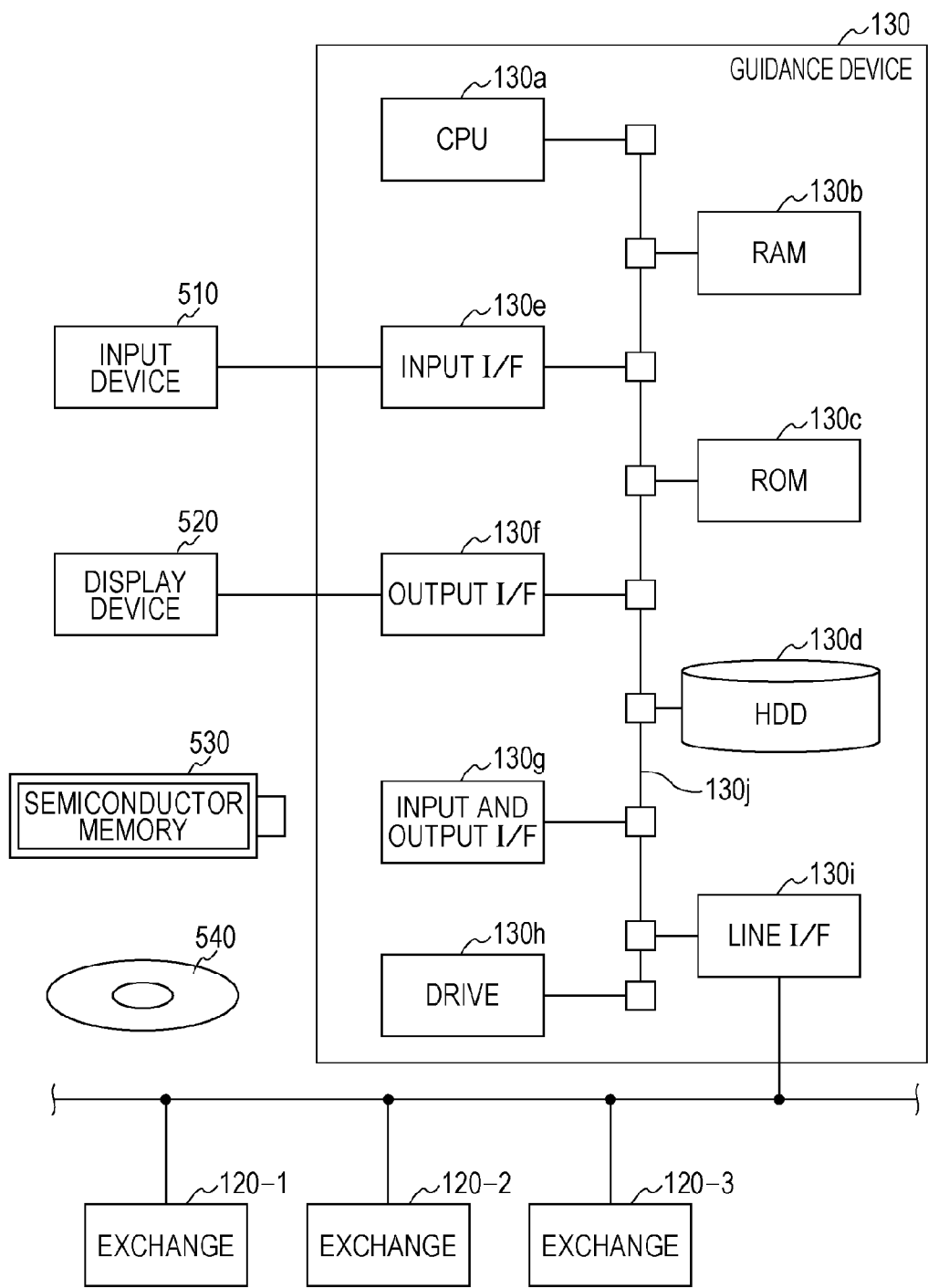
FIG. 5 is a block diagram illustrating an example of a hardware configuration of the guidance device.

Referring now to FIG. 5, a hardware configuration of the guidance device 130 is described. Since the guidance device 230, and the exchanges 120-1, 120-2, 120-3, 220-1, 220-2, and 220-3 basically have a configuration similar to the configuration of the guidance device 130, the guidance device 130 is described as an example.

FIG. 5 is a block diagram illustrating an example of the hardware configuration of the guidance device 130. The guidance device 130 includes a central processing unit (CPU) 130*a*, random access memory (RAM) 130*b*, read only memory (ROM) 130*c*, and a hard disc drive (HDD) 130*d*. The guidance device 130 further includes an input interface (I/F) 130*e*, an output I/F 130*f*, and an input and output I/F 130*g*. The guidance device 130 further includes a drive 130*h* and a line I/F 130*i*. The CPU 130*a*, the RAM 130*b*, the ROM 130*c*, the HDD 130*d*, the input I/F 130*e*, the output I/F 130*f*, the input and output I/F 130*g*, the drive 130*h*, and the line I/F 130*i* are connected to one another through a bus 130*j*. A computer may be implemented when at least the CPU 130*a* and the RAM 130*b* cooperate.

An input device 510 is connected to the input I/F 130*e*. The input device 510 may be, for example, a keyboard or a mouse. A display device 520 is connected to the output I/F 130*f*. The display device 520 may be, for example, a liquid crystal display. Semiconductor memory 530 is connected to the input and output I/F 130*g*. The semiconductor memory 530 may be, for example, Universal Serial Bus (USB) memory or flash memory. The input and output I/F 130*g* reads a program or data stored in the semiconductor memory 530. The input I/F 130*e* and the input and output I/F 130*g* may include USB ports for example.

A portable recording medium 540 may be inserted in the drive 130*h*. The portable recording medium 540 may be, for example, a removable disc, such as a compact disc (CD)-ROM or a digital versatile disc (DVD). The drive 130*h* reads a program or data recorded in the portable recording medium 540.

The line I/F 130*i* includes a LAN interface, such as a LAN card or a network adapter. The exchanges 120-1, 120-2, and 120-3, and a printing device, which is not illustrated, are connected to the line I/F 130*i*.

The above-described RAM 130*b* reads a program stored in one of the ROM 130*c*, the HDD 130*d*, and the semiconductor memory 530. The RAM 130*b* reads the program recorded in the portable recording medium 540. When the CPU 130a executes the read program, each function of the guidance device 130 other than the identification information storage unit 131, the operational status storage unit 132, and the audio guidance storage unit 133, that is, the transmission and reception unit 134, the guidance request processing unit 135, the audio guidance extraction unit 136, the audio guidance transmission unit 137, the identification information management unit 138, the operational status management unit 139, and the connection control unit 140 may be implemented. When the CPU 130a executes the read program, the guidance device 130 executes a guidance method, which is described below. The program desirably corresponds to flowcharts described below.

The operations of the communication system S are now described.

Figure 6:
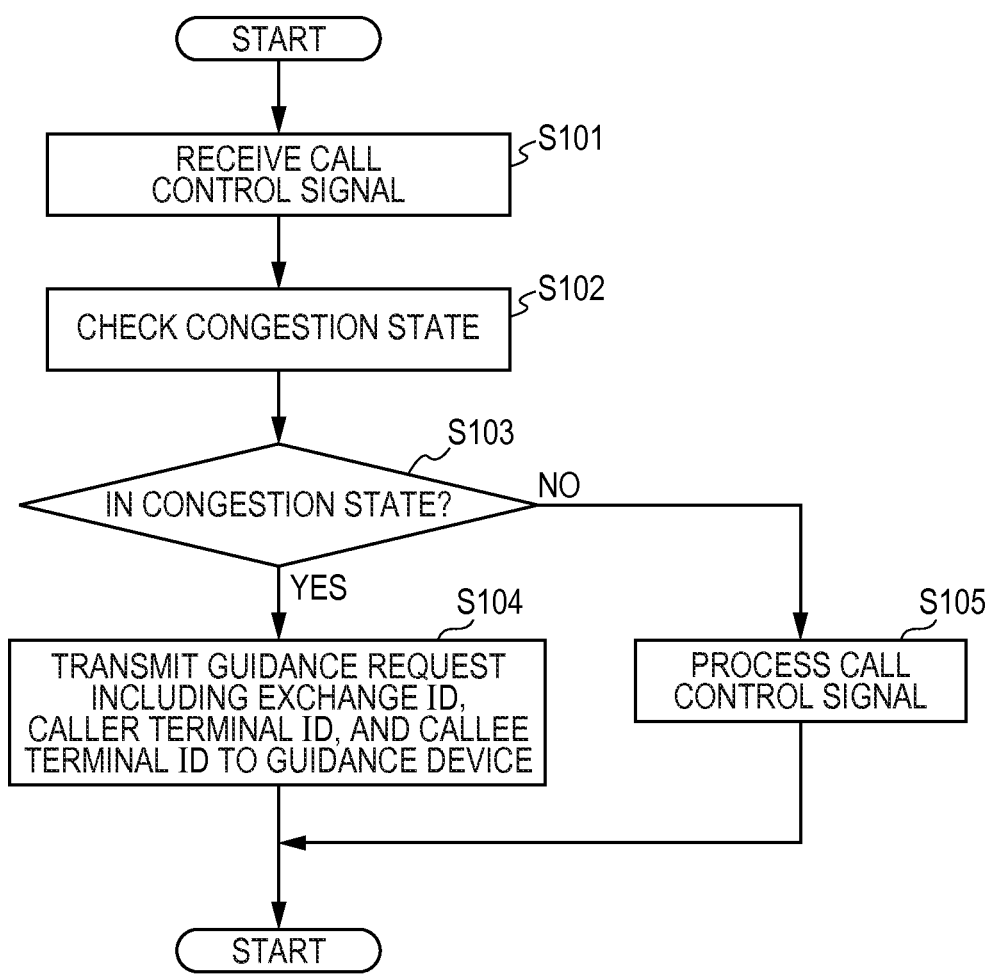
FIG. 6 is a flowchart illustrating an example of operations of an exchange that receives a call control signal.
Figure 7:
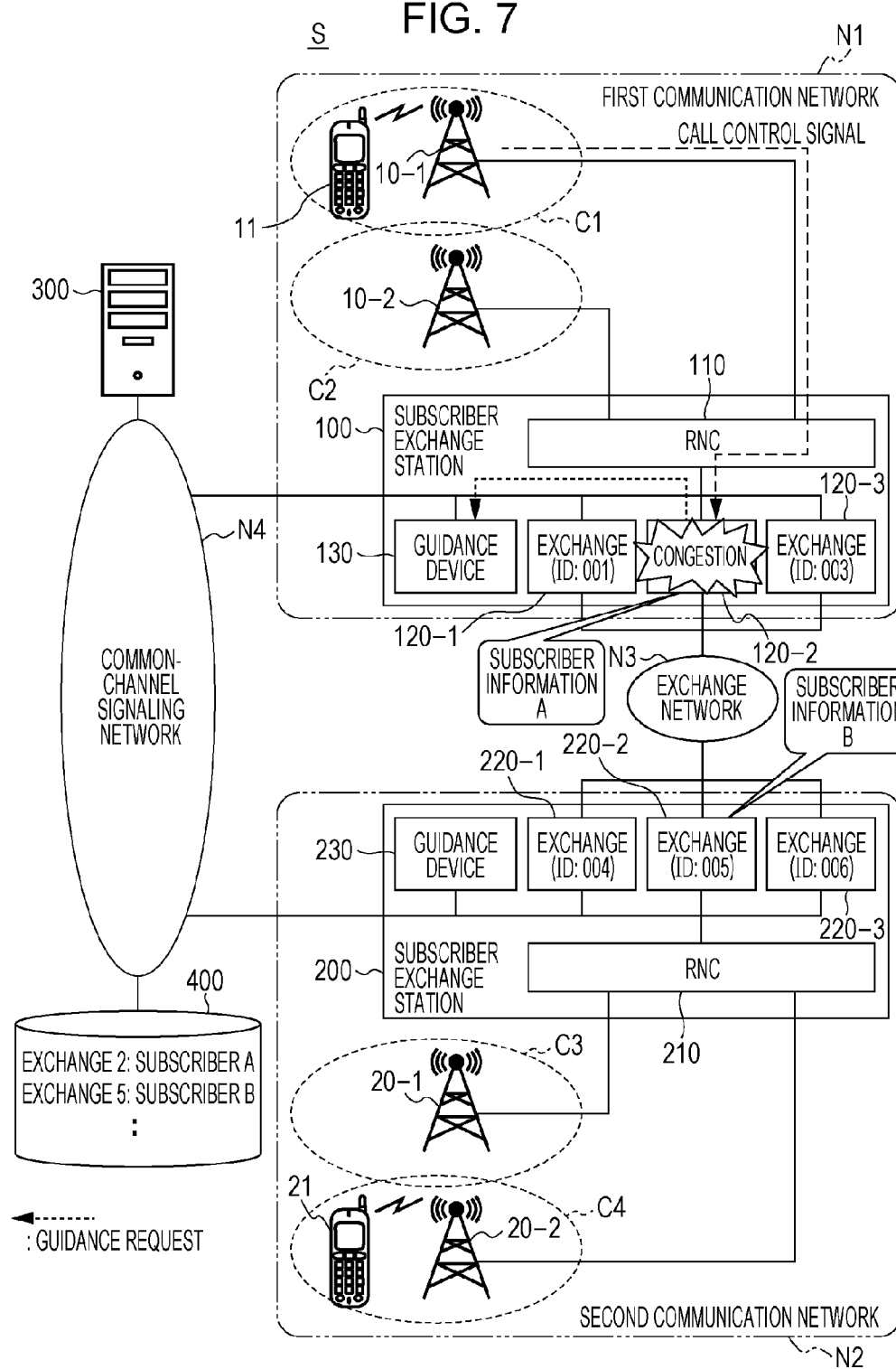
FIG. 7 is an illustration for explaining an example of operations of the communication system according to a first embodiment.

First, the operations of the exchange 120 that receives the call control signal with reference to FIGS. 6 and 7 are described.

FIG. 6 is a flowchart illustrating an example of the operations of the exchange 120 that receives the call control signal. FIG. 7 is an illustration for explaining an example of the operations of the communication system S according to the first embodiment. First, as illustrated in FIG. 6, the call control signal processing unit 124 receives a call control signal through the call control signal transmission and reception unit 123 (operation S101). More specifically, as illustrated in FIG. 7, when the call control signal is transmitted from the caller terminal 11, the base station 10-1 forwards the call control signal to the RNC 110. The RNC 110 transmits the call control signal to the exchange 120-2 to which the subscriber information is allocated. The call control signal transmission and reception unit 123 receives the transmitted call control signal. The call control signal transmission and reception unit 123 transmits the received call control signal to the call control signal processing unit 124.

Subsequently, when the call control signal processing unit 124 receives the call control signal, the congestion state management unit 125 checks the congestion state (operation S102). The congestion state is checked by accessing the congestion state storage unit 121. The congestion state management unit 125 notifies the call control signal processing unit 124 of the result of the check.

After that, the call control signal processing unit 124 determines whether or not the exchange 120-2 is in the congestion state (operation S103). When the congestion state "CONGESTION" is notified from the congestion state management unit 125, the call control signal processing unit 124 determines that the exchange 120-2 is in the congestion state (operation S103: YES). When the congestion state "NORMAL" is notified from the congestion state management unit 125, the call control signal processing unit 124 determines that the exchange 120-2 is not in the congestion state (operation S103: NO).

When it is determined that the exchange 120-2 is in the congestion state, the call control signal processing unit 124 transmits a guidance request including the exchange ID concerned, the caller terminal ID, and the callee terminal ID to the guidance device 130 through the call control signal transmission and reception unit 123 (operation S104). Accordingly, as illustrated in FIG. 7, the guidance request is transmitted to the guidance device 130. When it is determined that the exchange 120-2 is not in the congestion state, the call control signal processing unit 124 processes the call control signal (operation S105).

Figure 8:
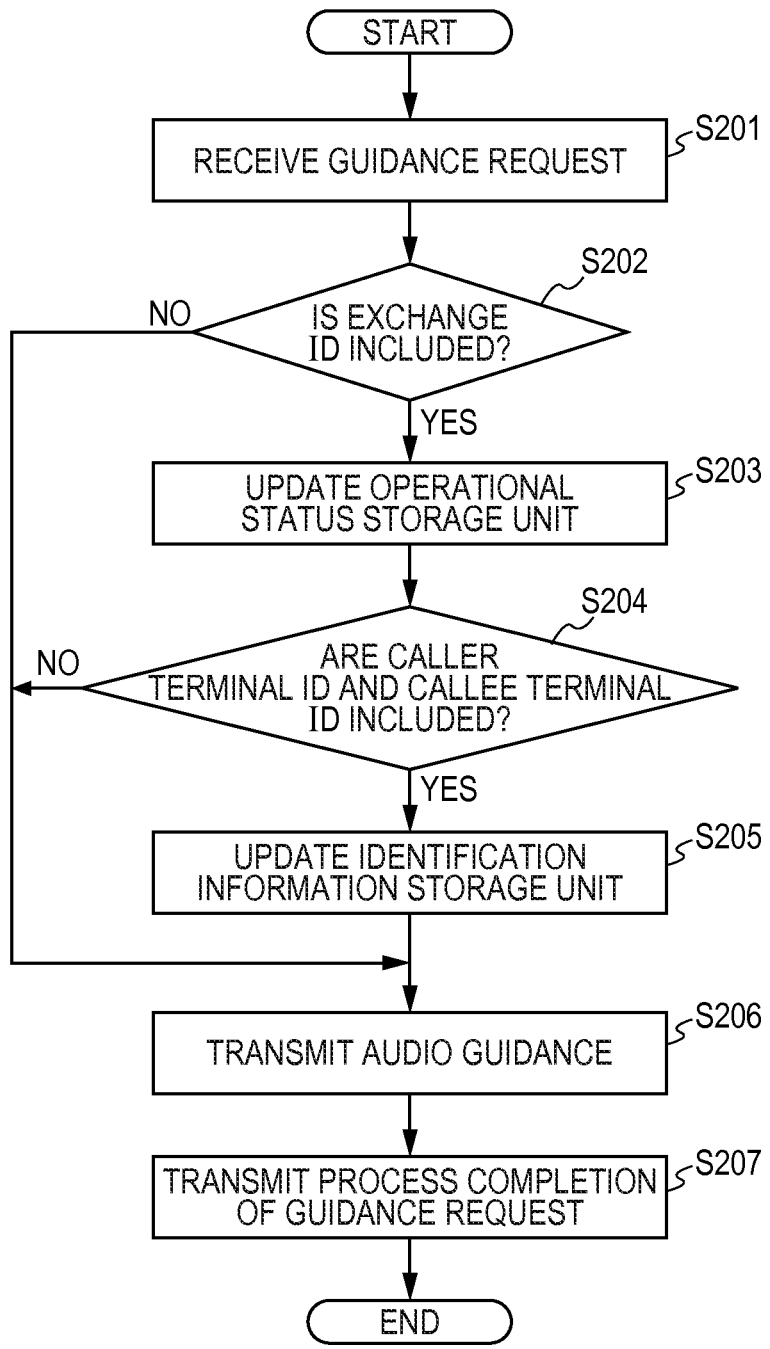
FIG. 8 is a flowchart illustrating an example of operations of the guidance device that receives a guidance request.
Figure 9:
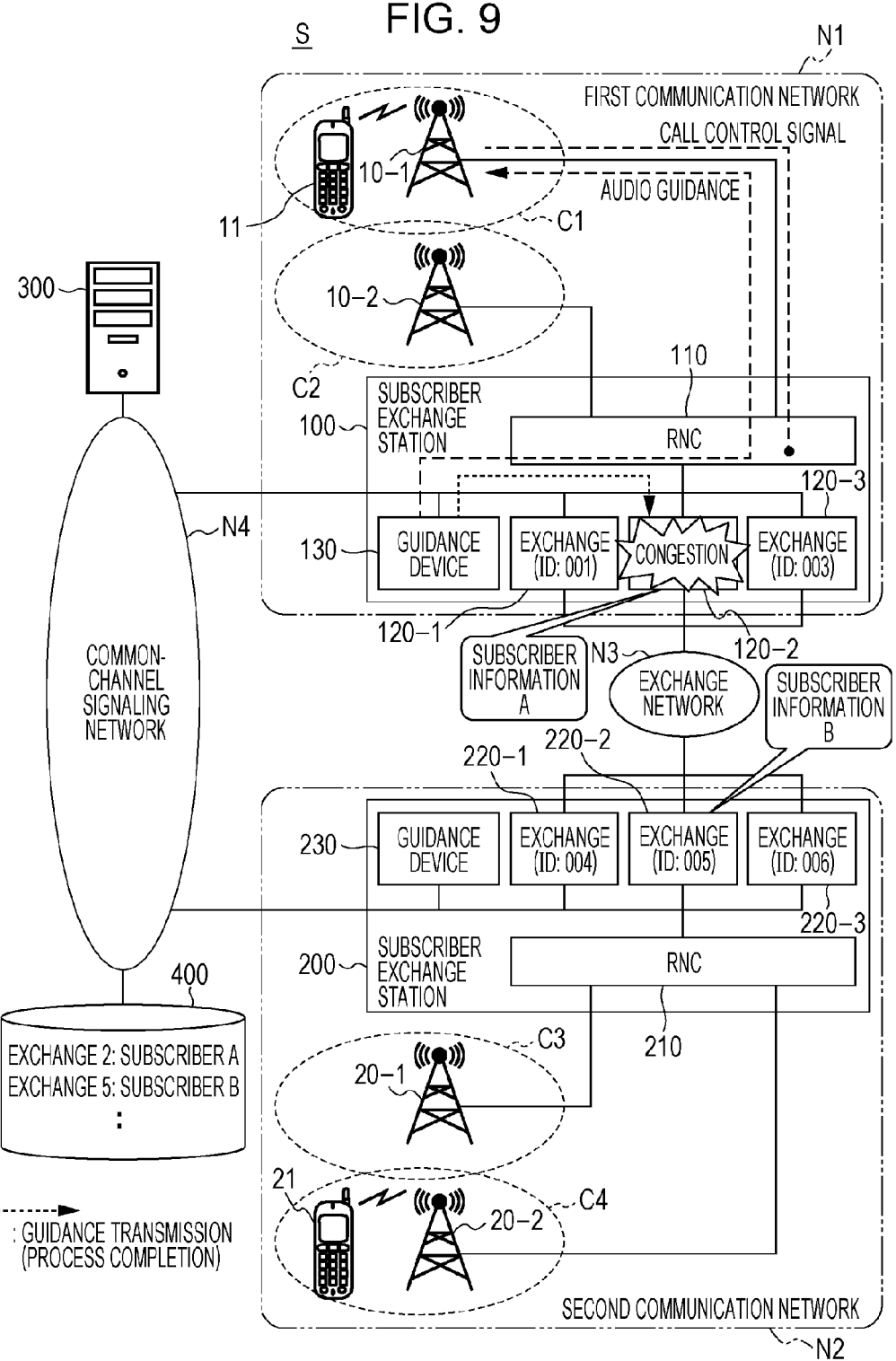
FIG. 9 is an illustration for explaining an example of the operations of the communication system according to the first embodiment.

Referring now to FIGS. 8 and 9, the operations of the guidance device 130 that receives the guidance request are described.

FIG. 8 is a flowchart illustrating an example of the operations of the guidance device 130 that receives the guidance request. FIG. 9 is an illustration for explaining an example of the operations of the communication system S according to the first embodiment. As illustrated in FIG. 8, the guidance request processing unit 135 receives the guidance request through the transmission and reception unit 134 (operation S201). Subsequently, the guidance request processing unit 135 determines whether or not the guidance request includes an exchange ID (operation S202). When it is determined that the guidance request includes the exchange ID (operation S202: YES), the operational status management unit 139 updates the operational status storage unit 132 (operation S203). As a result, the congestion state "PRESENT" and the operational status "CONGESTION" are registered for the exchange ID included in the guidance request, which belongs to the plurality of exchange IDs in the operational status table. That is, the reception of the exchange ID brings the determination that the exchange 120 to which the exchange ID concerned is allocated is in the congestion state.

Subsequently, the guidance request processing unit 135 determines whether or not the guidance request includes the caller terminal ID and the callee terminal ID (operation S204). When it is determined that the guidance request includes the caller terminal ID and the callee terminal ID (operation S204: YES), the identification information management unit 138 updates the identification information storage unit 131 (operation S205). As a result, the reservation order is allocated to a pair of the caller terminal ID and the callee terminal ID and registered as the reservation information in the identification information table. The reservation information is held until the reconnection instruction signal is transmitted to the exchange 120.

After that, the audio guidance transmission unit 137 transmits audio guidance (operation S206). More specifically, the audio guidance extraction unit 136 extracts the audio guidance based on the LGN transmitted from the guidance request processing unit 135. For example, when the exchange 120-2 is in the congestion state, an LGN "2" is included in the guidance request. Accordingly, the audio guidance is extracted based on the LGN "2". The audio guidance extraction unit 136 transmits the extracted audio guidance to the audio guidance transmission unit 137, and the audio guidance transmission unit 137 transmits the received audio guidance to the caller terminal 11. As a result, as illustrated in FIG. 9, the audio guidance is transmitted from the guidance device 130 to the caller terminal 11 while maintaining the connection state of the call control signal.

Subsequently, the transmission and reception unit 134 transmits the process completion of the guidance request (operation S207). As a result, as illustrated in FIG. 9, the guidance transmission (process completion) is provided to the exchange 120-2 that is in the congestion state.

Figure 10:
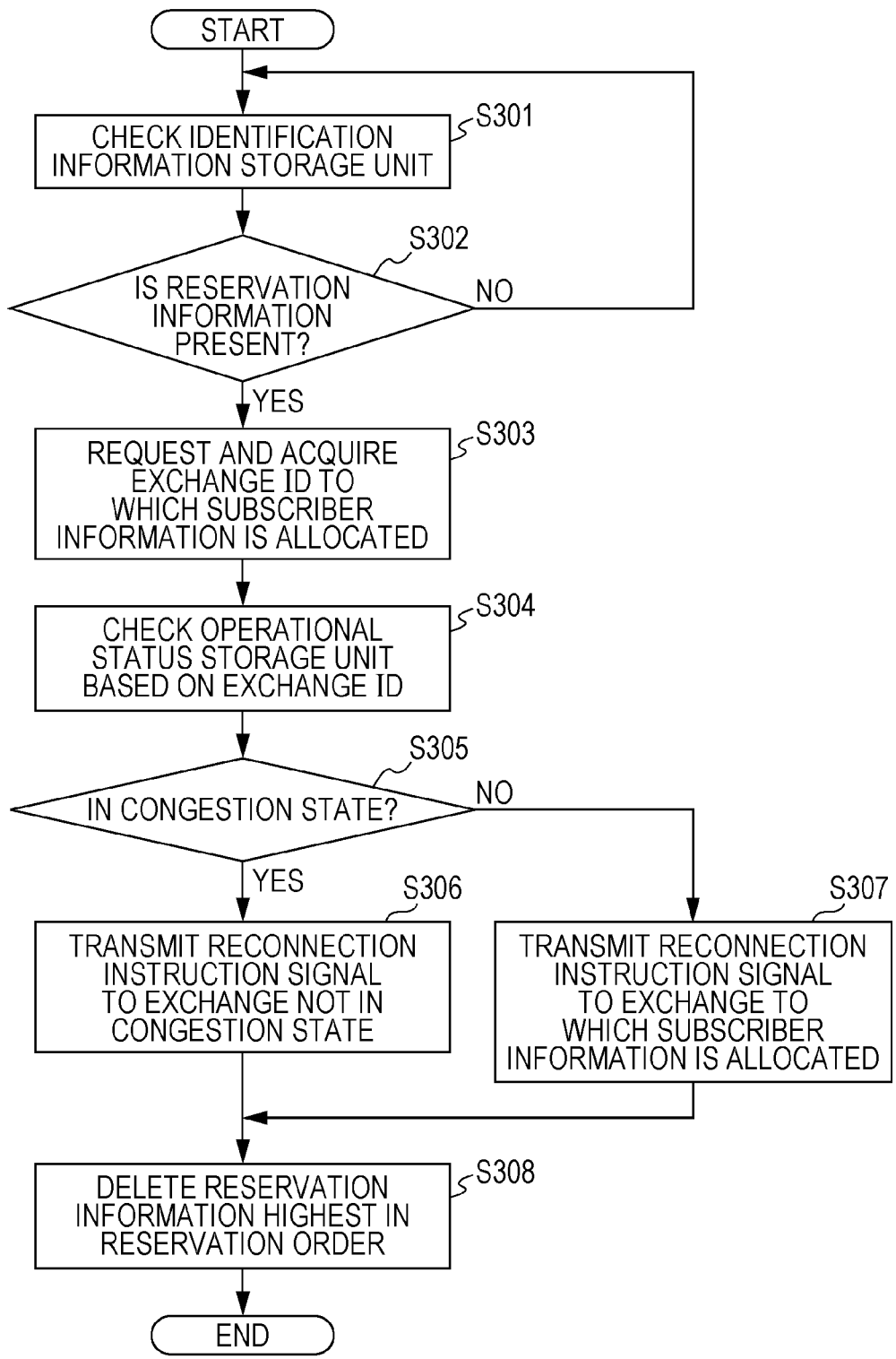
FIG. 10 is a flowchart illustrating an example of the operations of the guidance device that executes reconnection control.
Figure 11:
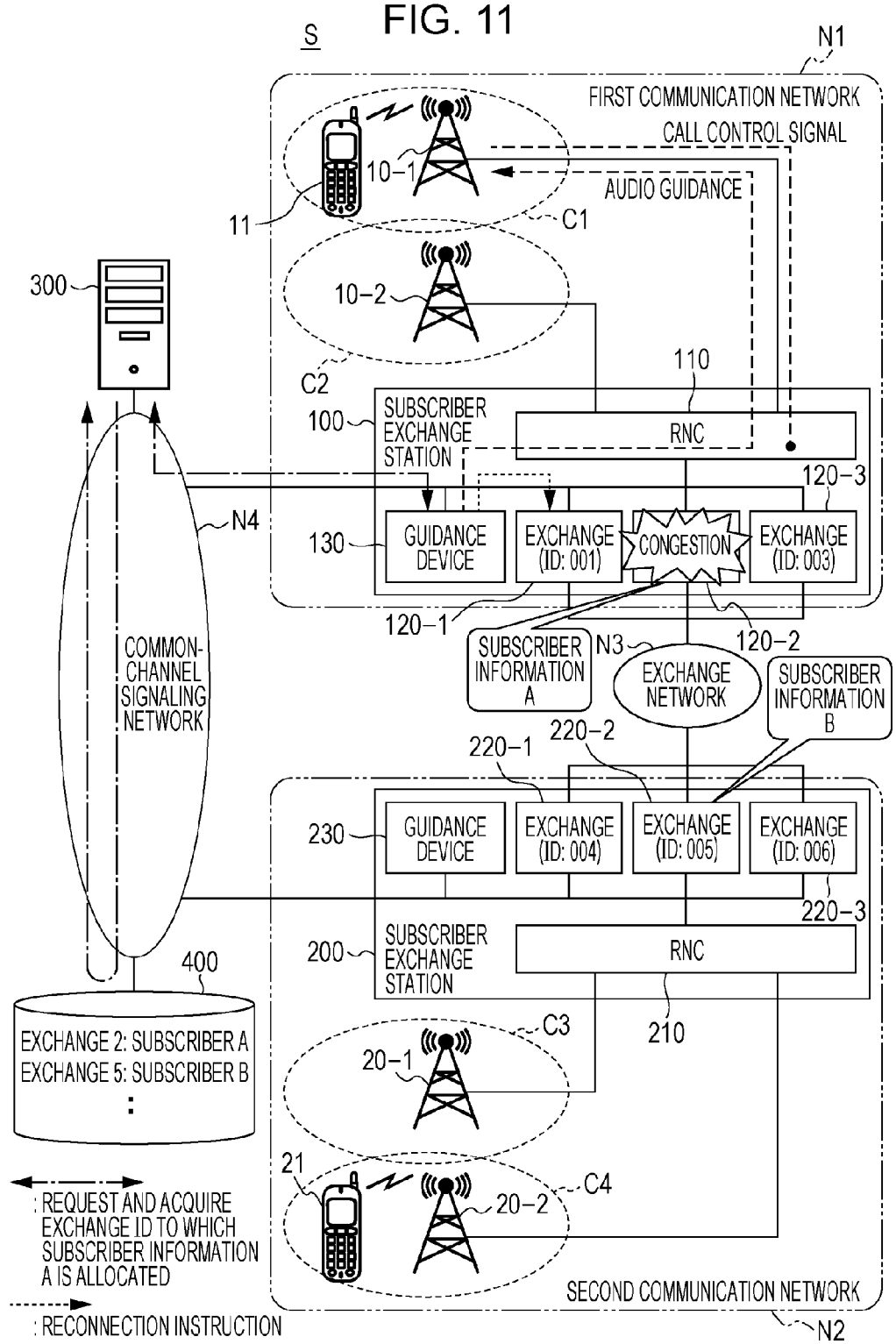
FIG. 11 is an illustration for explaining an example of the operations of the communication system according to the first embodiment.

Referring now to FIGS. 10 and 11, the operations of the guidance device 130 that executes the reconnection control are described.

FIG. 10 is a flowchart illustrating an example of the operations of the guidance device 130 that executes the reconnection control. FIG. 11 is an illustration for explaining an example of the operations of the communication system S according to the first embodiment.

First, the identification information management unit 138 regularly checks the identification information storage unit 131 (operation S301). More specifically, the identification information management unit 138 accesses the identification information storage unit 131 and checks the presence or absence of the reservation information. The identification information management unit 138 notifies the connection control unit 140 of the presence or absence of the reservation information. Subsequently, the connection control unit 140 determines whether or not the reservation information is present in the identification information storage unit 131 based on the presence or absence of the reservation information notified from the identification information management unit 138 (operation S302). When it is determined that no reservation information is present (operation S302: NO), the process returns to operation S301. That is, the presence or absence of the reservation information is regularly checked.

When it is determined that the reservation information is present (operation S302: YES), the connection control unit 140 requests the exchange ID to which the subscriber information is allocated and acquires the exchange ID (operation S303). More specifically, as illustrated in FIG. 11, the guidance device 130 (the connection control unit 140) transmits the caller terminal ID included in the reservation information to the service controller 300. The service controller 300 searches the HLR 400 based on the received caller terminal ID. Since the correspondence relation between the subscriber information and the exchange ID is recorded in the HLR 400, the exchange ID caused to correspond to the subscriber information that has the caller terminal ID is transmitted to the service controller 300. The service controller 300 transmits the received exchange ID to the guidance device 130 (the connection control unit 140).

When the connection control unit 140 receives the exchange ID, the operational status management unit 139 checks the operational status storage unit 132 based on the received exchange ID (operation S304). That is, the operational status management unit 139 checks whether or not the exchange 120-2 is currently still in the congestion state. The operational status management unit 139 notifies the connection control unit 140 of the presence or absence of the congestion state.

The connection control unit 140 receives the notification from the operational status management unit 139 and determines whether or not the exchange 120-2 is in the congestion state (operation S305). When the connection control unit 140 determines that the exchange 120-2 is in the congestion state (operation S305: YES), the connection control unit 140 transmits a reconnection instruction signal including the caller terminal ID to the exchange 120-1 or 120-3 that is not in the congestion state (operation S306). FIG. 11 indicates that the reconnection instruction signal is transmitted to the exchange 120-1.

When the connection control unit 140 determines that the exchange 120-2 is not in the congestion state (operation S305: NO), the connection control unit 140 transmits the reconnection instruction signal to the exchange 120-2 to which the subscriber information is allocated (operation S307). That is, when the congestion state of the exchange 120-2 is released, the call control signal is processed using the exchange 120-2 to which the subscriber information is already allocated.

When the connection control unit 140 transmits the reconnection instruction signal, the identification information management unit 138 deletes the reservation information highest in the reservation order (operation S308). That is, the process for the reservation information highest in order is completed and the reservation information subsequent in order is promoted.

Figure 12:
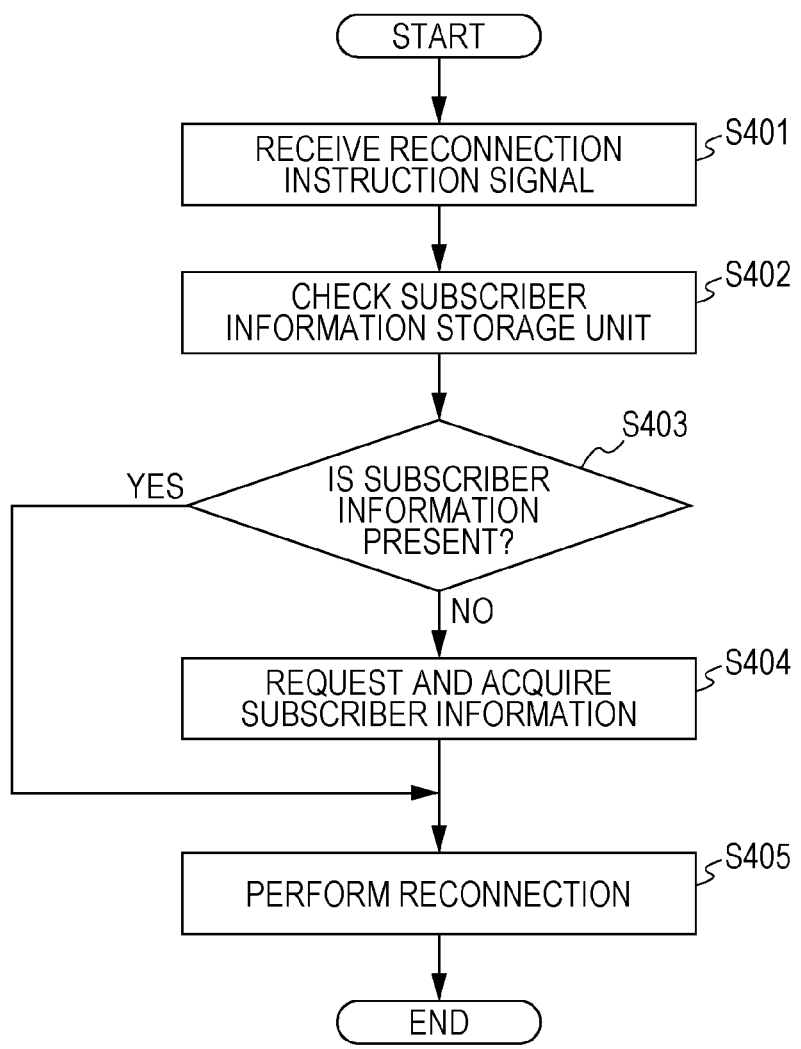
FIG. 12 is a flowchart illustrating an example of an exchange that executes reconnection.
Figure 13:
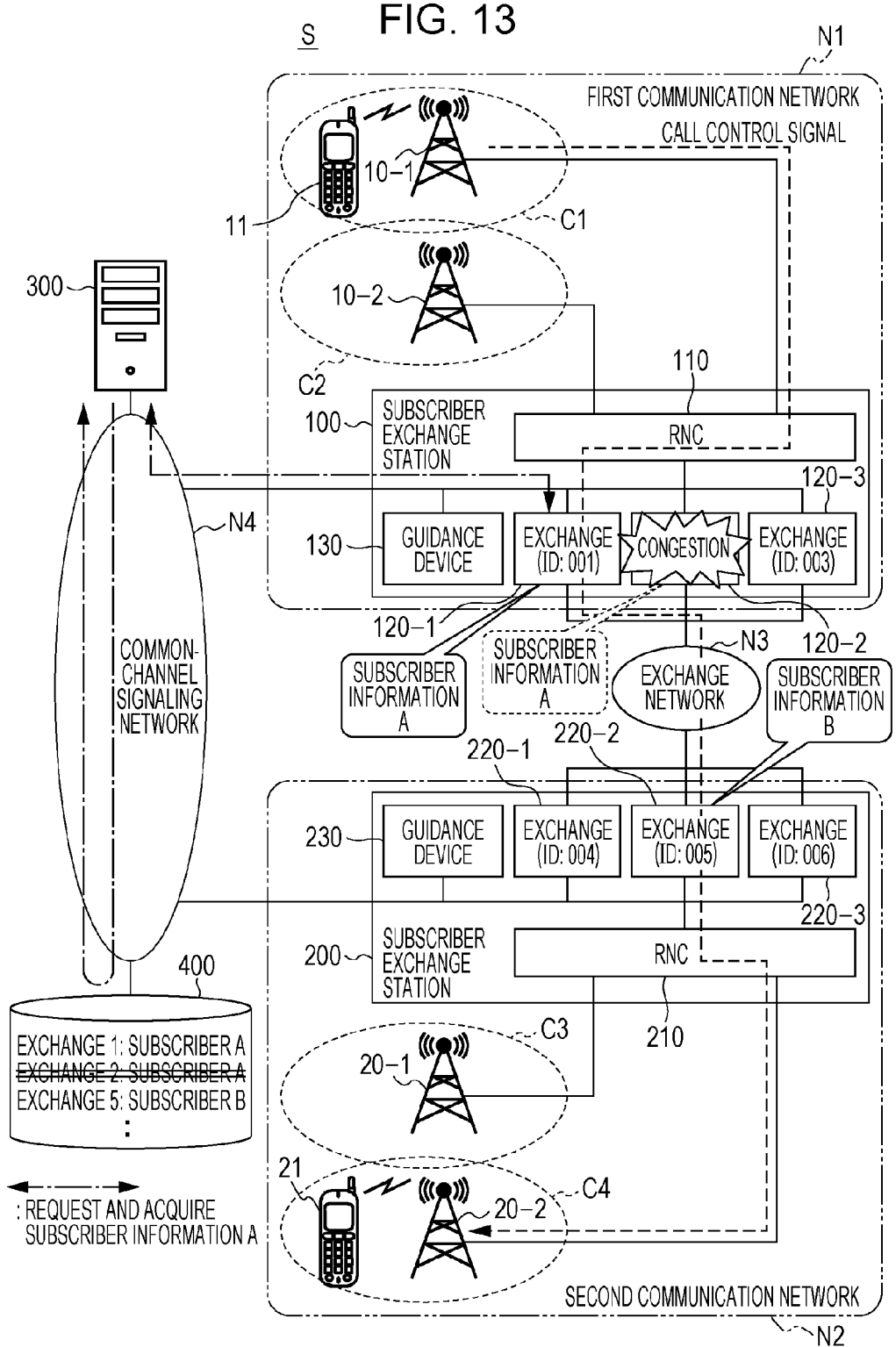
FIG. 13 is an illustration for explaining an example of the operations of the communication system according to the first embodiment.

Referring now to FIGS. 12 and 13, the operations of the exchange 120-1 that performs the reconnection and is not in the congestion state are described.

FIG. 12 is a flowchart illustrating an example of the operations of the exchange 120-1 that executes the reconnection. FIG. 13 is an illustration for explaining an example of the operations of the communication system S according to the first embodiment. As illustrated in FIG. 12, the call control signal processing unit 124 receives a reconnection instruction signal through the call control signal transmission and reception unit 123 (operation S401). When the call control signal transmission and reception unit 123 receives the reconnection instruction signal, the subscriber information management unit 126 checks the subscriber information storage unit 122 (operation S402). More specifically, the subscriber information management unit 126 accesses the subscriber information storage unit 122 and checks whether or not the subscriber information corresponding to the caller terminal ID included in the reconnection instruction signal. After the check, the subscriber information management unit 126 notifies the call control signal processing unit 124 of the presence or absence of the subscriber information.

When the presence or absence of the subscriber information is notified, the call control signal processing unit 124 determines whether or not the subscriber information is present (operation S403). When it is determined that no subscriber information is present (operation S403: NO), the call control signal processing unit 124 requests the service controller 300 for the subscriber information through the call control signal transmission and reception unit 123 and acquires the subscriber information (operation S404). More specifically, as illustrated in FIG. 13, the exchange 120-1 (the call control signal processing unit 124) transmits the caller terminal ID to the service controller 300. The service controller 300 searches the HLR 400 based on the caller terminal ID. While the plurality of pieces of subscriber information are recorded in the HLR 400, the service controller 300 extracts the subscriber information based on the caller terminal ID. The service controller 300 transmits the extracted subscriber information to the exchange 120-1. The subscriber information is stored in the subscriber information storage unit 122. As a result, the subscriber information is allocated to the exchange 120-1 and it becomes possible to process the call control signal. In synchronization with such operations, in the HLR 400, subscriber information the same as the subscriber information allocated to the exchange 120-2 is allocated to the exchange 120-1 and the subscriber information that has been allocated to the exchange 120-2 is deleted. The service controller 300 transmits an instruction to delete the subscriber information that has been allocated to the exchange 120-2 to the exchange 120-2 based on the contents recorded in the HLR 400. As a result, the subscriber information that has been allocated to the exchange 120-2 vanishes. That is, the subscriber information that the exchange 120-2 in the congestion state has held moves to the exchange 120-1 not in the congestion state. When it is determined that the subscriber information is present (operation S403: YES), it is already possible to process the call control signal and thus, the call control signal processing unit 124 skips operation S404.

When the call control signal processing unit 124 acquires the subscriber information, the call control signal processing unit 124 performs the reconnection (operation S405). As a result, as illustrated in FIG. 13, the call control signal that has been in a stand-by state in the RNC 110 is transmitted to the exchange 120-1. The call control signal is transmitted to the exchange 220-2 after the exchange 120-1 performs the authentication operation and the call originating operation. Furthermore, the call control signal is transmitted to the callee terminal 21 through the RNC 210 and the base station 20-2.

As described above, according to the first embodiment, when the congestion is caused by the exchange 120-2 on the side of the caller terminal 11, the communication connection may be established by inhibiting the call reoriginating operation. In particular, the subscriber information that the exchange 120-2 in the congestion state has held is allocated to the exchange 120-1 not in the congestion state and the call control signal is processed. Thus, even when the exchange 120-2 is in the congestion state, the call control signal is transmitted to the callee terminal 21 by avoiding the exchange 120-2. Furthermore, since the process for the call control signal is relaxed in the exchange 120-2 in the congestion state, the congestion may easily be released.

Second Embodiment

A second embodiment of the present application is now described with reference to FIGS. 14 to 17. The second embodiment differs from the first embodiment in that the congestion is caused by the exchange 220-2 on the side of the callee terminal 21. The operations of the exchanges 220-1, 220-2, and 220-3, and the guidance device 230 according to the second embodiment are basically similar to the operations of the exchanges 120-1, 120-2, and 120-3, and the guidance device 130 according to the first embodiment. Thus, the explanation using a flowchart is omitted.

Figure 14:
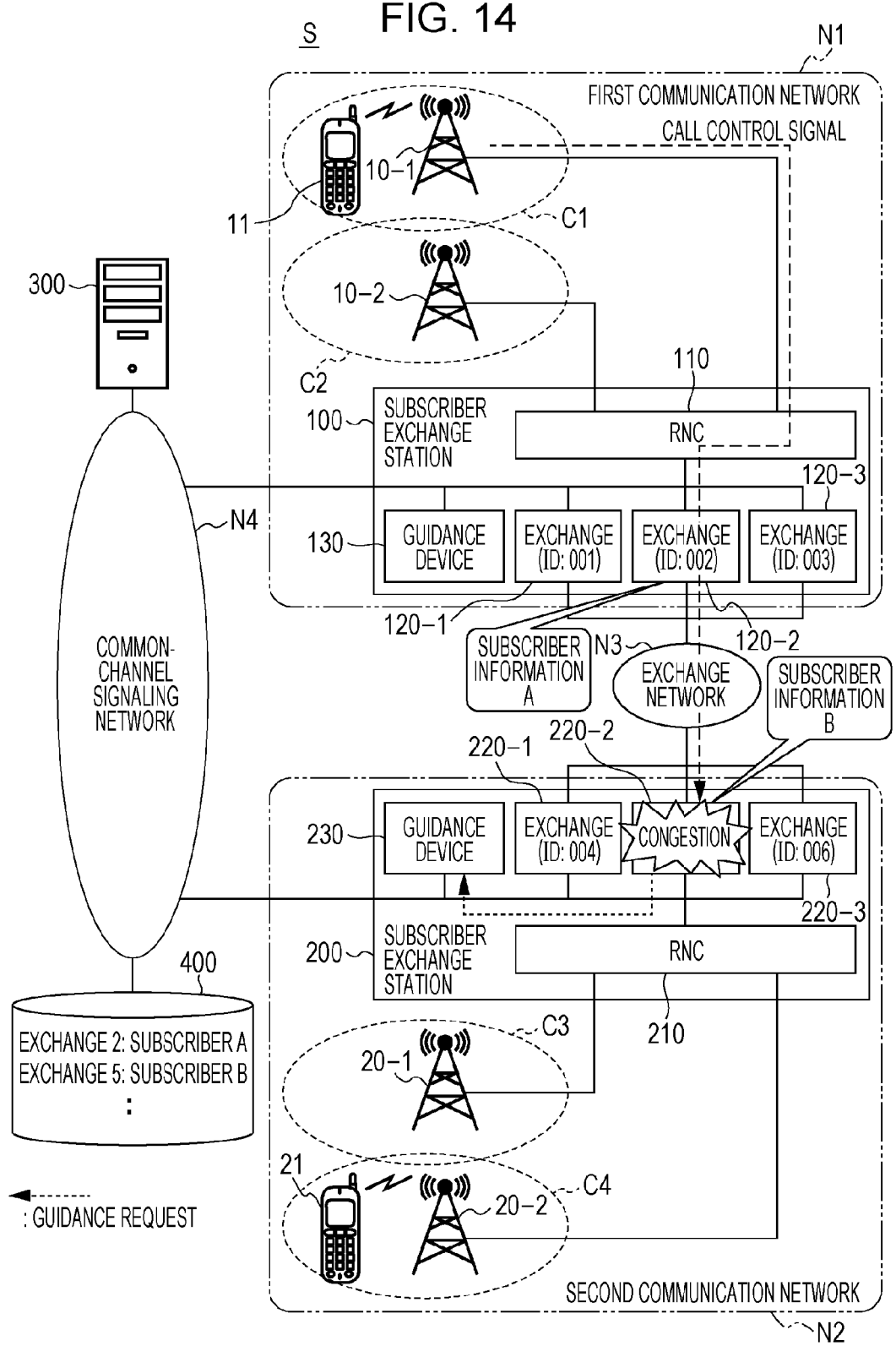
FIG. 14 is an illustration for explaining an example of operations of a communication system according to a second embodiment.

FIGS. 14 to 17 are illustrations for explaining examples of the operations of the communication system S according to the second embodiment. First, as illustrated in FIG. 14, when a call control signal is transmitted from the caller terminal 11, the base station 10-1 forwards the call control signal to the RNC 110. The RNC 110 transmits the call control signal to the exchange 120-2 to which the subscriber information is allocated. In the exchange 120-2, the call control process including the authentication operation and the call originating operation is performed. As a result, the call control signal is transmitted to the exchange 220-2 to which the subscriber information is allocated. When the exchange 220-2 is in the congestion state, the exchange 220-2 transmits a guidance request to the guidance device 230.

Figure 15:
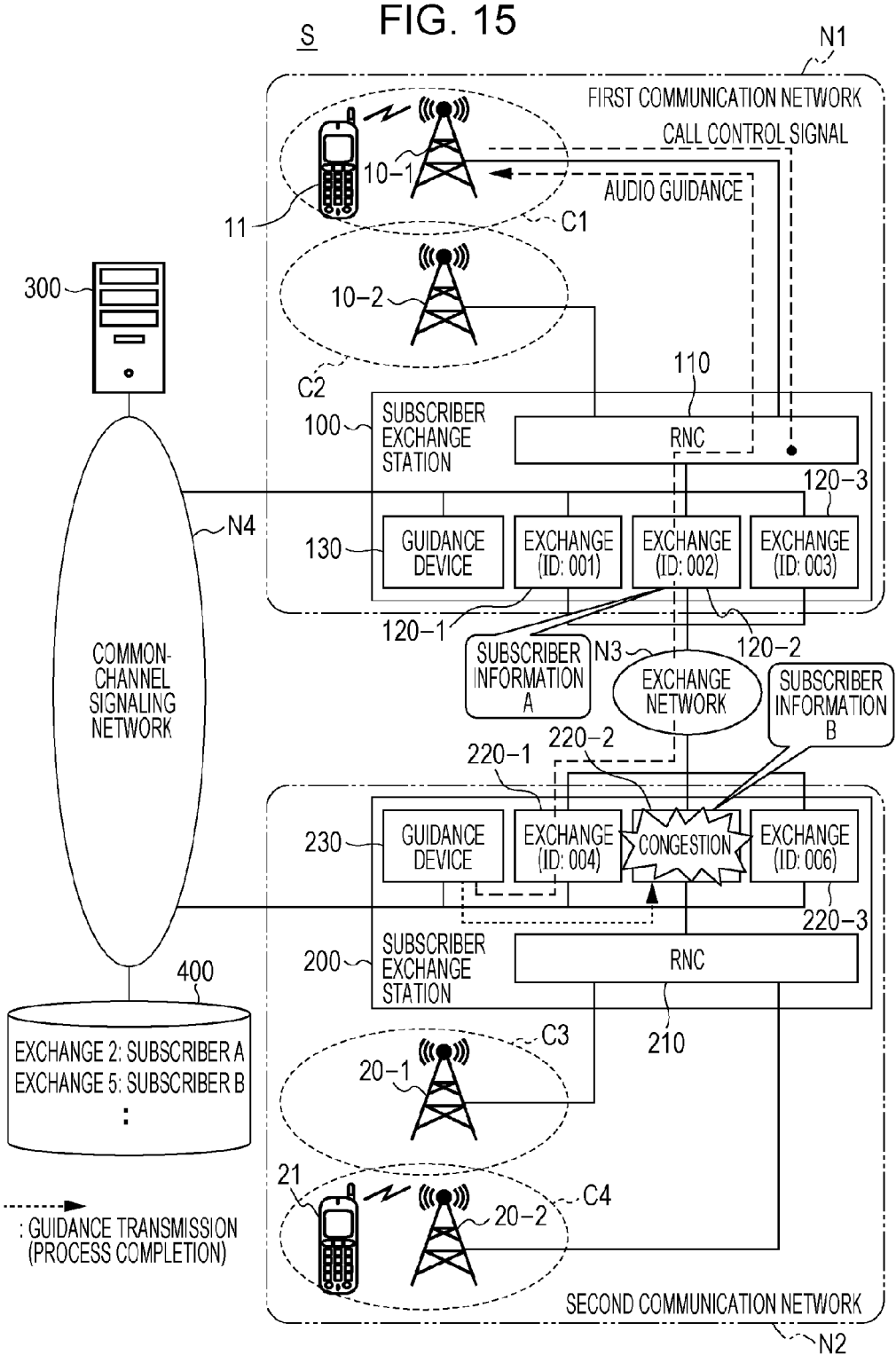
FIG. 15 is an illustration for explaining an example of the operations of the communication system according to the second embodiment.

After that, as illustrated in FIG. 15, the guidance device 230 receives a guidance request, the guidance device 230 updates the operational status of the exchange 220-2 based on the exchange ID included in the guidance request. Furthermore, the guidance device 230 causes the reservation information to be registered based on the caller terminal ID and the callee terminal ID included in the guidance request. When such operations are completed, the guidance device 230 transmits audio guidance to the caller terminal 11 and provides the guidance transmission (process completion) to the exchange 220-2 that has transmitted the guidance request.

Figure 16:
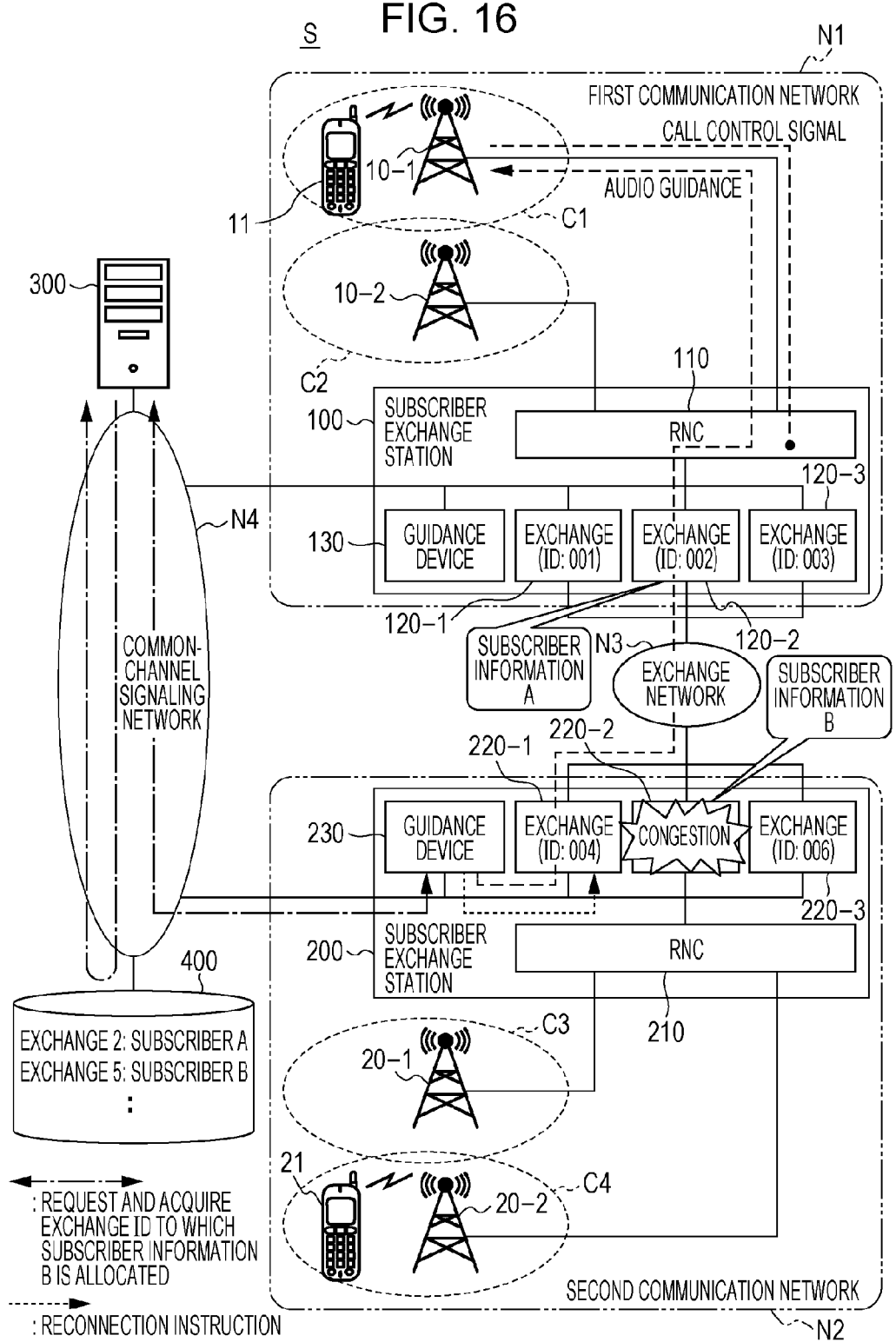
FIG. 16 is an illustration for explaining an example of the operations of the communication system according to the second embodiment.

After that, as illustrated in FIG. 16, the guidance device 230 transmits the callee terminal ID of the registered reservation information to the service controller 300. The service controller 300 acquires the exchange ID corresponding to the callee terminal ID from the HLR 400 based on the callee terminal ID. The service controller 300 transmits the acquired exchange ID to the guidance device 230. The guidance device 230 checks the operational status of the exchange 220-2 based on the received exchange ID. When the operational status of the exchange 220-2 indicates the congestion state, for example, the guidance device 230 transmits a reconnection instruction signal including the callee terminal ID to the exchange 220-1 that is not in the congestion state.

Figure 17:
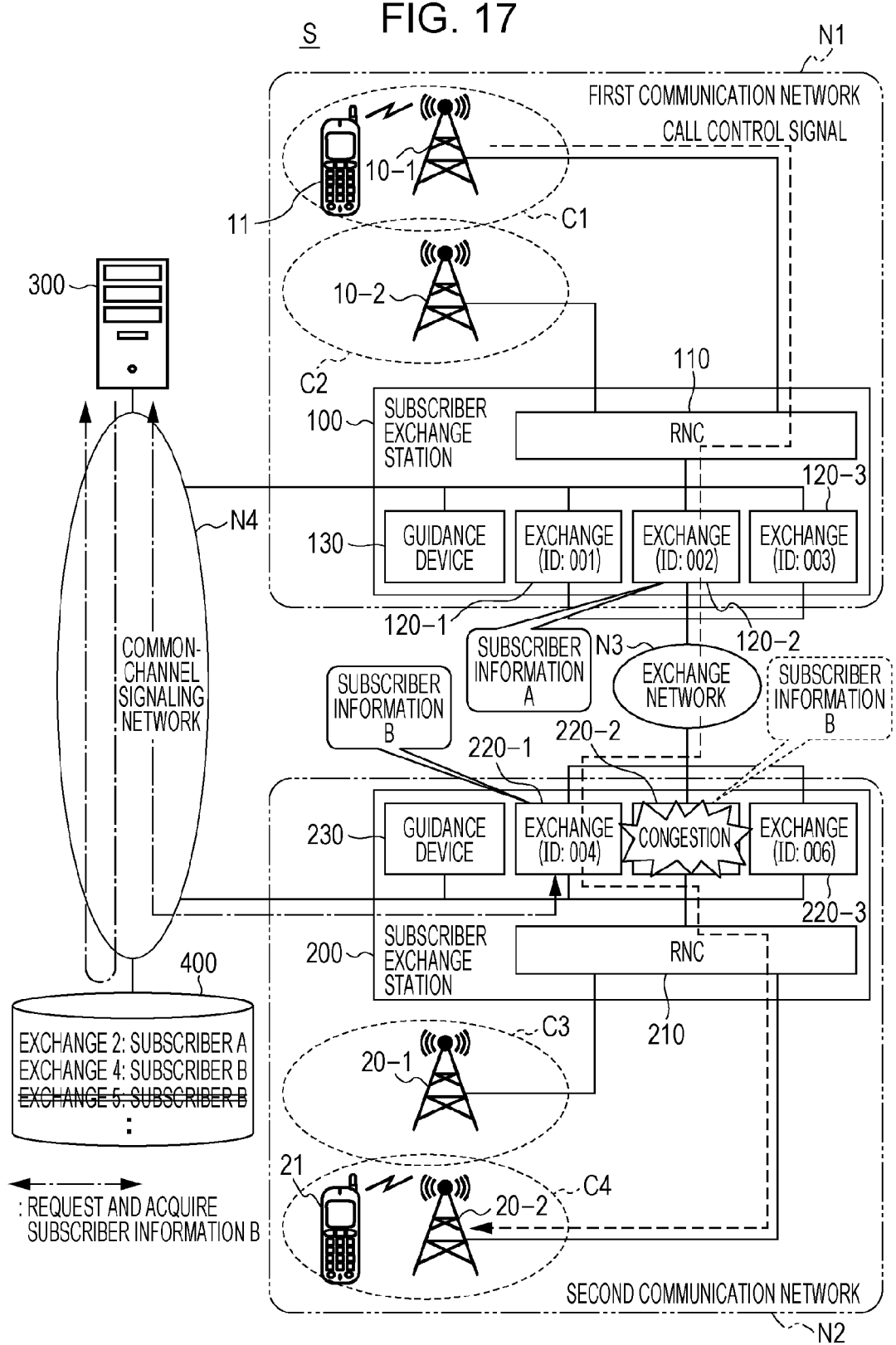
FIG. 17 is an illustration for explaining an example of the operations of the communication system according to the second embodiment.

Lastly, as illustrated in FIG. 17, the received exchange 220-1 that has received the reconnection instruction signal checks whether or not the subscriber information is present so as to process the call control signal. When no subscriber information is present, the callee terminal ID is transmitted to the service controller 300. The service controller 300 acquires the subscriber information corresponding to the callee terminal ID from the HLR 400 based on the callee terminal ID. The service controller 300 transmits the acquired subscriber information to the exchange 220-1. When the exchange 220-1 receives the subscriber information, the exchange 220-1 executes the reconnection. As a result, the call control signal is processed by the exchange 220-1 and the communication connection between the caller terminal 11 and the callee terminal 21 is established.

As described above, even when the congestion is caused by the exchange 220-2 on the side of the callee terminal 21, the communication connection may be established by inhibiting the call reoriginating operation. In particular, the subscriber information that the exchange 220-2 in the congestion state has held is allocated to the exchange 220-1 not in the congestion state and the call control signal is processed. Thus, even when the exchange 220-2 is in the congestion state, the call control signal is transmitted to the callee terminal 21 by avoiding the exchange 220-2. Furthermore, since the process for the call control signal is relaxed in the exchange 220-2 in the congestion state, the congestion may easily be released.

Furthermore, the present application may be applied to a combination of the first embodiment and the second embodiment. That is, even when at least one of the exchanges 120-1, 120-2, and 120-3 is in the congestion state and at least one of the exchanges 220-1, 220-2, and 220-3 is in the congestion state, the communication connection for the call control signal may be established by connecting at least one of the exchanges 120-1, 120-2, and 120-3 that is not in the congestion state to at least one of the exchanges 220-1, 220-2, and 220-3 that is not in the congestion state.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A guidance device comprising:
    an audio guidance transmission unit configured to transmit audio guidance to encourage refraining from a call reoriginating operation to a caller terminal when first identification information to identify a first exchange that is in a congestion state and second identification information to identify the caller terminal are received from the first exchange; and a connection control unit configured to cause the caller terminal and a callee terminal to be connected through a second exchange that is not in the congestion state based on the received first identification information, the received second identification information, and presence or absence of the congestion state of exchanges under management.

2. The guidance device according to claim 1, wherein the connection control unit causes the caller terminal and the callee terminal to be connected through the second exchange by transmitting an instruction to the second exchange to hold subscriber information for processing a call control signal transmitted from the caller terminal.

3. The guidance device according to claim 1, further comprising:
an identification information management unit configured to, when third identification information to identify the callee terminal is received together with the second identification information, manage the received second identification information and the received third identification information as a pair,
wherein the connection control unit causes the caller terminal and the callee terminal to be connected based on the second identification information and the third identification information that are managed by the identification information management unit.

4. The guidance device according to claim 2, further comprising:
an identification information management unit configured to, when third identification information to identify the callee terminal is received together with the second identification information, manage the received second identification information and the received third identification information as a pair,
wherein the connection control unit causes the caller terminal and the callee terminal to be connected based on the second identification information and the third identification information that are managed by the identification information management unit.

5. The guidance device according to claim 3, wherein
the identification information management unit allocates a reservation order that indicates a connection reservation order to the pair of the second identification information and the third identification information, and
the connection control unit causes the caller terminal and the callee terminal to be connected based on the reservation order.

6. The guidance device according to claim 4, wherein
the identification information management unit allocates a reservation order that indicates a connection reservation order to the pair of the second identification information and the third identification information, and
the connection control unit causes the caller terminal and the callee terminal to be connected based on the reservation order.

7. The guidance device according to claim 2,
wherein the subscriber information is transmitted from a controller that controls a communication service to the second exchange based on the second identification information.

8. The guidance device according to claim 3,
wherein the subscriber information is transmitted from a controller that controls a communication service to the second exchange based on the second identification information.

9. The guidance device according to claim 4,
wherein the subscriber information is transmitted from a controller that controls a communication service to the second exchange based on the second identification information.

10. The guidance device according to claim 5,
wherein the subscriber information is transmitted from a controller that controls a communication service to the second exchange based on the second identification information.

11. The guidance device according to claim 6,
wherein the subscriber information is transmitted from a controller that controls a communication service to the second exchange based on the second identification information.

12. A guidance system comprising:
a first exchange that is in a congestion state;
a second exchange that is not in the congestion state; and
a guidance device configured to transmit audio guidance to encourage refraining from a call re-originating operation to a caller terminal when first identification information to identify the first exchange and second identification information to identify the caller terminal are received from the first exchange, and causes the caller terminal and a callee terminal to be connected through the second exchange based on the received first identification information, the received second identification information, and presence or absence of a congestion state of an exchange under management.

13. A guidance method comprising:
transmitting audio guidance to encourage refraining from a call reoriginating operation to a caller terminal when first identification information to identify a first exchange that is in a congestion state and second identification information to identify the caller terminal are received from the first exchange; and
causing the caller terminal and a callee terminal to be connected through a second exchange that is not in the congestion state based on the received first identification information, the received second identification information, and presence or absence of the congestion state of exchanges under management, executed by a processor.

* * * * *